(12) United States Patent
Counts-Bradley

(10) Patent No.: US 7,946,444 B2
(45) Date of Patent: May 24, 2011

(54) TML INSPECTION PORT

(76) Inventor: Marie Counts-Bradley, Houston, TX (US)

( * ) Notice: Subject to any disclaimer, the term of this patent is extended or adjusted under 35 U.S.C. 154(b) by 919 days.

(21) Appl. No.: 11/820,156

(22) Filed: Jun. 18, 2007

(65) Prior Publication Data

US 2008/0308567 A1 Dec. 18, 2008

(51) Int. Cl.
*B65D 55/16* (2006.01)
*F16L 55/105* (2006.01)

(52) U.S. Cl. ............... 220/375; 220/254.3; 215/306; 138/92

(58) Field of Classification Search .......... 220/375, 220/254.3; 215/306, 344; 138/90, 92
See application file for complete search history.

(56) References Cited

U.S. PATENT DOCUMENTS

| | | | |
|---|---|---|---|
| 2,894,654 A * | 7/1959 | Lohrer | 215/235 |
| 3,018,024 A * | 1/1962 | Foord | 222/498 |
| 3,021,976 A * | 2/1962 | Tracy | 220/619 |
| 3,031,111 A | 4/1962 | Stull | |
| 3,204,829 A | 9/1965 | Song | |
| 3,282,477 A | 11/1966 | Henchert | |
| 3,462,048 A | 8/1969 | Henchert | |
| 3,584,760 A | 6/1971 | Grinker | |
| 3,926,348 A * | 12/1975 | Lutzker | 222/189.07 |
| 3,998,354 A | 12/1976 | Song | |
| 4,362,254 A | 12/1982 | Roth et al. | |
| 4,391,385 A | 7/1983 | Rausing | |
| 4,738,376 A | 4/1988 | Markus | |
| 4,838,441 A * | 6/1989 | Chernack | 215/216 |
| 6,082,576 A | 7/2000 | Ruby | |
| 2005/0184026 A1* | 8/2005 | Haley | 215/306 |
| 2005/0247714 A1* | 11/2005 | Backes et al. | 220/375 |
| 2006/0006134 A1* | 1/2006 | Luo | 215/388 |

* cited by examiner

*Primary Examiner* — Anthony Stashick
*Assistant Examiner* — James N Smalley
(74) *Attorney, Agent, or Firm* — David McEwing

(57) ABSTRACT

The device subject of this disclosure pertains to an insulated pipe or vessel including a single piece inspection plug device having a plug component attachable to an insulating structure and forming an aperture for access to an insulated pipe or vessel, a strap component attaching a lid component to the plug component, and that the lid component can be inserted into the aperture.

Also disclosed is a method of providing access to a pipe covered with insulating material and a metal jacket comprising cutting a hole in the metal jacket and inserting the bottom of the plug component into the hole and further including inserting screws or clips through at least one pilot hole. The method may include pressing a skirt of the plug component to form an outer seal of the plug to the metal jacket and/or holding the plug component to the metal jacket using at least one flexible locking ring on the bottom of the plug component.

13 Claims, 3 Drawing Sheets

TML INSPECTION PORT

BACKGROUND OF THE INVENTION

1. Field of Use

The device subject of this disclosure is used in conjunction with insulated pipes and vessels. These pipe or vessels are metal and covered with an insulating material and typically a second metal covering or metal jacket. Inspection plugs provide access through the outer metal layer and the insulation layer in order that the condition of the inner pipe can be assessed by ultrasonic or other means.

2. Related Technology

Access ports have been previously used such as disclosed in U.S. Pat. No. 6,082,576.

SUMMARY OF DEVICE

The device subject of this disclosure pertains to an insulated pipe or vessel including a single piece inspection plug device having a plug component attachable to an insulating structure and forming an aperture for access to an insulated pipe or vessel, a strap component attaching a lid component to the plug component, and that the lid component can be inserted into the aperture.

Also disclosed is a method of providing access to a pipe covered with insulating material and a metal jacket comprising cutting a hole in the metal jacket and inserting the bottom of the plug component into the hole and further including inserting screws or clips through at least one pilot hole. The method may include pressing a skirt of the plug component to form an outer seal of the plug to the metal jacket and/or holding the plug component to the metal jacket using at least one flexible locking ring on the bottom of the plug component.

The accompanying drawings, which are incorporated in and constitute a part of the specification, illustrate preferred embodiments of the invention. These drawings, together with the general description of the invention given above and the detailed description of the preferred embodiments given below, serve to explain the principles of the invention.

DETAILED DESCRIPTION OF THE DEVICE

The device is used to form an access port through a covering material and insulating material. This opening can be used to inspect the condition of an interior pipe. The interior pipe typically is a ferromagnetic material such as steel. The pipe can convey production or process liquids or chemicals. The interior pipe may be subject to corrosion or other wear. Monitoring the thickness or other properties of this pipe may be important. This monitoring activity may require the operator to contact the outer surface of the inner pipe. The testing may include testing of the thickness of the pipe. This can be performed by acoustic methods or otherwise.

The inner pipe is covered with an insulating material. The metal covering material (hereinafter "metal jacket") may be constructed to provide weather protection to the insulating material. The insulating value of many insulating materials is significantly diminished when wet. In many situations, the metal jacket is tubular with a constant radius. In some cases, the outer metal jacket, e.g., aluminum, has a corrugated surface.

One of the functions of the device subject of the disclosure is to provide a weather resistant means of access to the inner pipe. The device accomplishes that task in several ways as will be described herein.

The device may be constructed of silicone or EPDM. Other materials may be used such as elastomeric polymers. These materials are water repellant. The device may be used in conjunction silicone caulking or adhesives.

The device is a single piece. The plug component is attached to the lid component by the flexible strap component. The strap can be held in a substantially straight orientation relative to the plug and lid. It may be also folded over such as when the lid is inserted into the plug. As mentioned previously, the device, including the connector component, can be made of silicone, EPDM or similar material demonstrating flexibility, temperature tolerance (including flexibility in a wide temperature band), and UV damage resistance.

Figure 2:
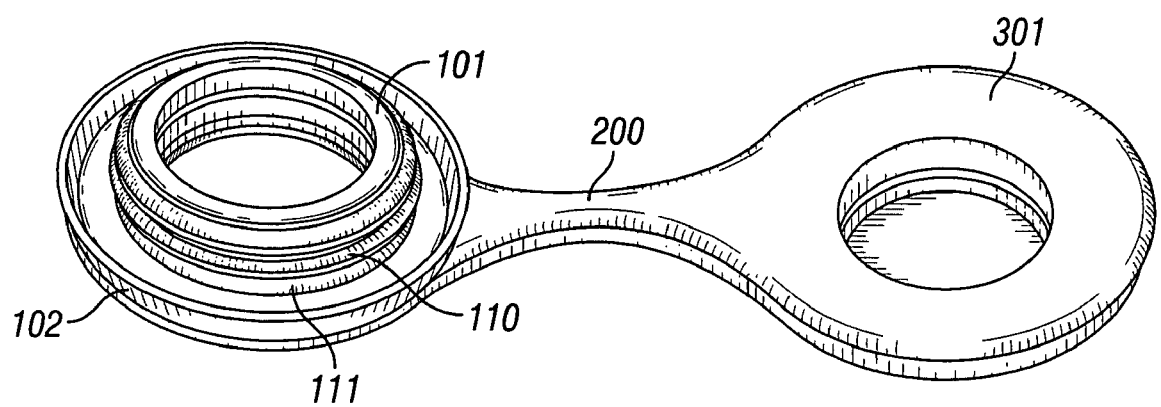
FIG. 2 illustrates a bottom view of the plug component, the connector strap and the top of the lid component.

There is the plug component comprising an inner annulus, an outer segment containing flexible locking rings used to attach the plug component to the metal covering of the insulated pipe. There is also an outer flexible skirt attached to the top of the plug component. The skirt creates a seal with uneven surfaces of the outer metal pipe cover. For example, a corrugated covering metal creates an uneven surface. (Reference FIG. 4) This seal is enhanced with the use of screws or clips attaching the plug to the metal pipe covering. (The pilot holes for the screws are illustrated in FIG. 2.)

There is an aperture in the plug component. It serves as access to the inner pipe. It also serves as the opening into which the lid component fits. The inner surface of the plug may contain an indentation. This indentation may be dimensioned to receive a counterpart lip located on the lid.

The outer surface of the plug may contain one or more locking rings. In one embodiment, each ring circumvents an outer surface of the plug. The locking ring is tapered upward toward the top of the plug. This facilitates the ring grasping or catching onto the edge of the metal covering. The locking rings are designed to be flexible to facilitate this holding function.

Attached to the opposite end of the connecting component is the lid component. In one embodiment, it is also made of the same material and may be molded as one piece with the connecting strap and the bottom plug.

In the embodiment shown, the lid component has an oversized brim. This facilitates pulling the lid out of the bottom plug. The lid also contains a cylindrical subcomponent dimensioned to fit within the aperture of the bottom plug. The cylindrical subcomponent is dimensioned to fit snuggly into the aperture. In one embodiment, there is a lip on the outer wall of the cylindrical subcomponent. This fits into a groove or notch in the interior wall of the plug (within the aperture of the plug).

The bottom of the cylindrical component of the lid contains a tab with a hole. This forms an attachment point for insulation that will extend into the hole and ideally to the inner metal pipe. The insulation "plug" may be simply tied to the hole within the tab.

It will be appreciated the device subject of this disclosure does not contain any handles that may be subject to tearing or breaking. The components are also not attached together with a lanyard, cord, tether or similar device.

FIG. 2 illustrates the device subject of the disclosure. The bottom plug section 101 is shown, along with the flexible skirt 102. The skirt can be pushed outward as a flange (103 in FIG. 1) is pushed down in response to the pressure from the top of the plug. This pressure can come from screws or clips used to attach the plug to the metal jacket. Also illustrated is the connector strap 200 and the top of the lid 301.

Figure 1:
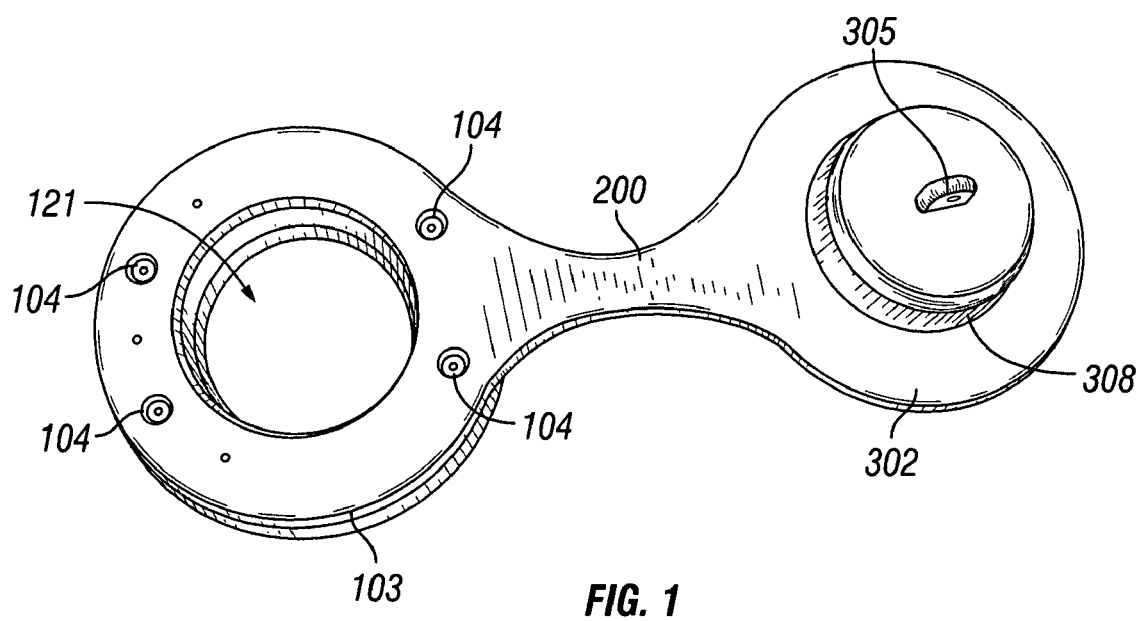
FIG. 1 illustrates the top of the plug component, the connector strap and the bottom of the lid.

FIG. 1 illustrates the top view of the plug section. Illustrated is the aperture 121 and the top of the plug component 103. In the embodiment illustrated, there are four predrilled or pilot holes 104. These holes can be used installing the device onto a metal jacket of the insulated pipe or vessel. For example, screws or clips may be used to fasten the plug to the metal jacket. Also illustrated are sub-components of the bottom of the lid. Shown are insulation attachment protrusion 305, the cylindrical portion 308 of the lid inserted into the plug and the extended lid flange 302.

Figure 3:
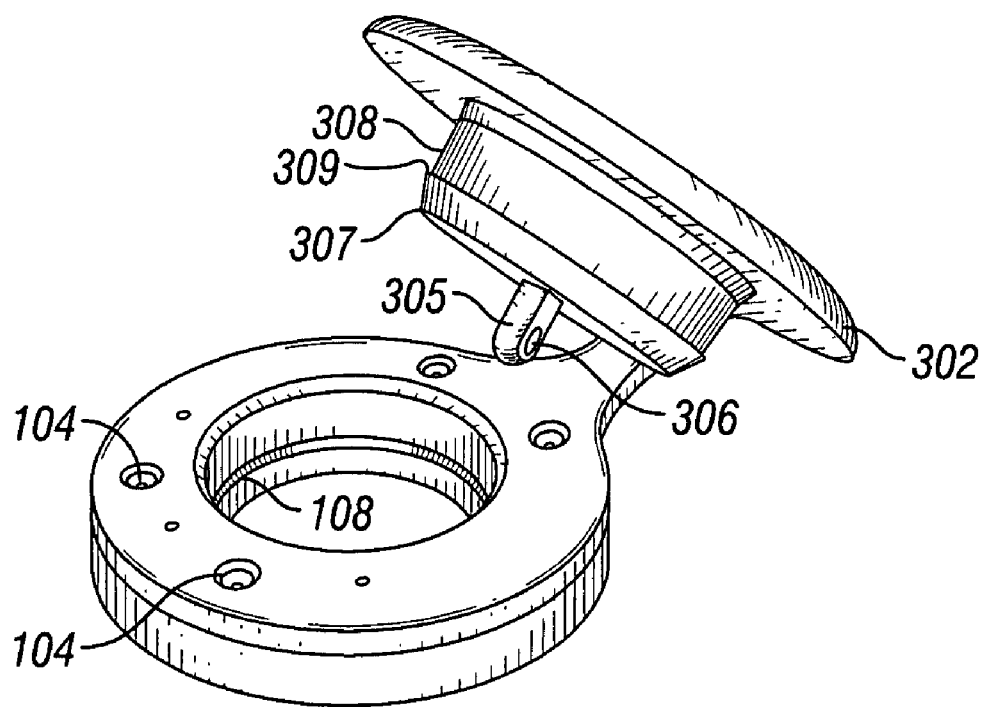
FIG. 3 illustrates the position of the lid to the plug when the lid is inserted into the plug aperture.

FIG. 3 illustrates the relationship of the lid and plug components fitting together. Specifically illustrated is the indenture 108 within the plug side wall that matches the edge 309 of the lip 307 located on the cylinder portion 308 of the lid. The protrusion 305 and hole 306 is illustrated. Also illustrated is the flange 302 of the lid. On the plug, the four predrilled or pilot holes 104 are also shown.

Figure 4:
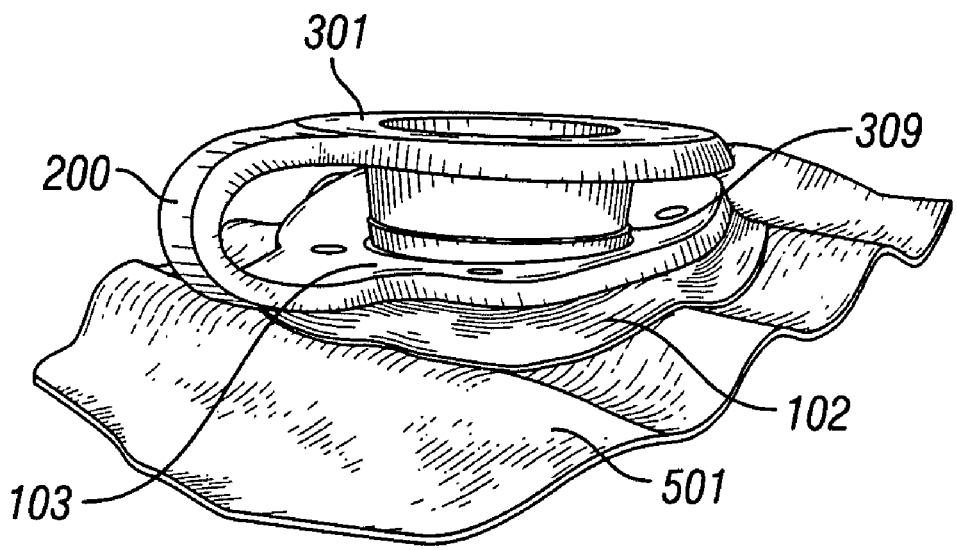
FIG. 4 illustrates the lid inserted into the plug aperture when the plug has been installed into a piece of corrugated metal.

FIG. 4 illustrates the device installed on a corrugated pipe covering material 501. Included is the skirt 102 extending from the plug wall and conforming to the uneven metal surface. In one embodiment of the invention, silicone caulking or similar material may be placed at the juncture of the skirt and corrugated pipe covering. The top portion 103 of the plug component is also visible. The edge 309 of the lip on the lid is also visible. The folded connecting strap 200 is shown. The top 301 of the lid is also illustrated.

Figure 5:
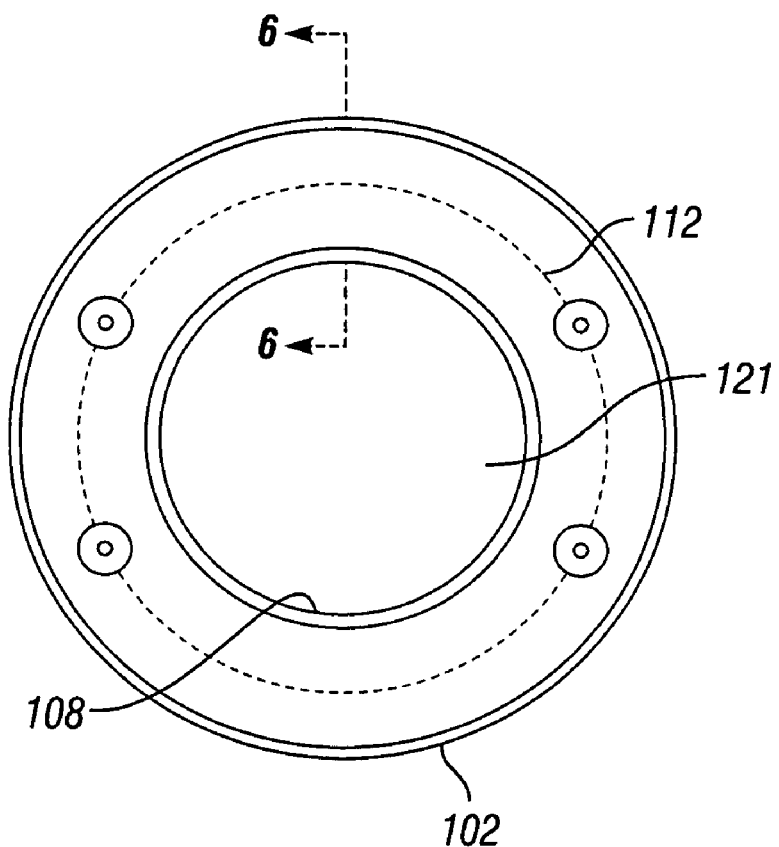
FIG. 5 illustrates a top view illustrating the location of the flexible skirt sub-component of the plug, the locking rings and pilot holes.

FIG. 5 illustrates a top view of the plug. The outer ring 102 is comprised of the flexible skirt. The inner layer 112 contains flexible locking rings on the outer surface. The inner surface of the inner ring is the access aperture 121 and may contain the indenture 108 that complements the lip of the lid.

Figure 6:
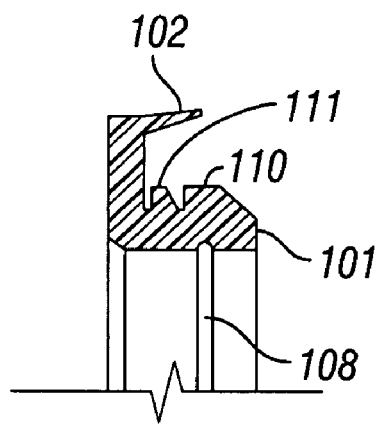
FIG. 6 is a cross sectional view of the plug illustrating the locking ring.

FIG. 6 illustrates a cross-sectional view of the plug indicated by arrows 6-6 in FIG. 5 showing the configuration of the flexible locking rings 110, 111 the skirt 102 and the indenture 108 for the lid lip edge.

This specification is to be construed as illustrative only and is for the purpose of teaching those skilled in the art the manner of carrying out the invention. It is to be understood that the forms of the invention herein shown and described are to be taken as the presently preferred embodiments. As already stated, various changes may be made in the shape, size and arrangement of components or adjustments made in the steps of the method without departing from the scope of this invention. For example, equivalent elements may be substituted for those illustrated and described herein and certain features of the invention may be utilized independently of the use of other features, all as would be apparent to one skilled in the art after having the benefit of this description of the invention.

Further modifications and alternative embodiments of this invention will be apparent to those skilled in the art in view of this specification.

What I claim is:

1. An insulated pipe or vessel single piece inspection plug device comprising:
    a) a plug component attachable to an insulating structure and forming an aperture for access to an insulated pipe or vessel;
    b) a strap component attaching a lid component to the plug component;
    c) the lid component can be inserted into the aperture; and
    d) a deformable skirt component of elastomeric polymers pressed against the insulating structure surface and deflected to be substantially parallel to the plane of the aperture.

2. The plug component of claim 1 further comprising at least one circumferential locking ring having a flexible edge.

3. The locking ring of claim 2 further comprising an angled edge and groove to receive an edge of the insulating structure surface.

4. The plug component of claim 1 further comprising a pilot hole.

5. The device of claim 1 further comprising silicone or EDPM.

6. The device of claim 1 further comprising a cylindrical lid sub-component dimensioned to fit into the aperture.

7. The cylindrical lid sub-component of claim 6 further comprising a circumferential lip edge at the bottom of the lid dimensioned to fit within an indenture within an inner wall of the plug component.

8. An insulated pipe and vessel single piece inspection plug device comprising
    (a) a plug component;
    (b) a skirt component to the plug that can be pushed outward to substantially conform to an undulating insulating structure surface;
    (c) the plug component having angled ridges and a groove to receive an edge of the undulating insulating structure surface;
    (d) a component connecting the plug to a lid; and
    (e) a lid dimensioned to sealably fit into an aperture of the plug.

9. The device of claim 8 wherein the skirt component can deform to sealably fit to an outer insulating covering of the pipe or vessel.

10. The device of claim 8 further comprising a plug component having indentations or pilot holes.

11. The device of claim 8 further comprising a protruding component with a hole extending from the inside of the lid whereby the protruding component that can be attached to insulation.

12. The device of claim 8 further comprising the skirt component forming a seal with the insulating structure surface.

13. The device of claim 8 further comprising:
    a) a first indentation on an inside cylinder component of the plug; and
    b) a protruding lip edge extending from the outer surface of lid and dimensioned to fit with the first indentation on the inside cylinder component of the plug.

* * * * *